Jan. 11, 1927. 1,614,056
C. H. AYARS
CANNING MACHINE
Filed July 20, 1926 6 Sheets-Sheet 1

WITNESSES:
Alfred E. Ischinger
George A. Gruss

INVENTOR:
Charles H. Ayars,
BY
Joshua R. H. Potts
ATTORNEY.

Jan. 11, 1927.

C. H. AYARS

CANNING MACHINE

Filed July 20, 1926 6 Sheets-Sheet 6

WITNESSES:

INVENTOR:
Charles H. Ayars,
BY
ATTORNEY.

Patented Jan. 11, 1927.

1,614,056

UNITED STATES PATENT OFFICE.

CHARLES H. AYARS, OF SALEM, NEW JERSEY, ASSIGNOR TO AYARS MACHINE COMPANY, OF SALEM, NEW JERSEY.

CANNING MACHINE.

Application filed July 20, 1926. Serial No. 123,615.

My invention relates to canning machines and more particularly to cookers.

The cookers now in use have conveyors for moving sealed cans, filled with food, through a heated casing to cook their contents. To quicken the cooking the cans are rolled through the casing to agitate their contents and thus effect a quicker transfer of heat to the contents.

The chief objection to such cookers is that they agitate the contents too much. The result is the solids in the cans get squashed, especially when they are tomatoes. When the cans are opened, the squashed contents appear as of inferior grade. This has caused the canner a considerable loss in commercially disposing of such canned goods.

Cookers have been proposed to remedy this condition by causing the cans to roll just sufficiently to effect proper cooking without squashing the solids. These have been found unsatisfactory in that they were unreliable or of such complicated nature as to prohibit their use.

The objects of my invention are to provide a cooker of simple and rugged construction in which the food in the cans may be quickly cooked without squashing the solids; to provide a cooker in which the filled cans are fed directly to the conveying means outside the casing where accidental misplacement of the cans may be readily seen and adjusted before damage is done; to provide a cooker in which the conveying means although being free of steam sealing mechanism, will prevent the escape of steam; and to provide a winding conveyor which will not twist, is free of special mechanism for preventing twisting, and is driven at a number of points in its length to avoid straining the conveyor to the breaking point.

These objects, and other advantageous ends which will be described hereinafter, I attain in the following manner, reference being had to the accompanying drawings in which—

Briefly the cooker consists of a casing for confining steam for cooking purposes; a non-twisting winding conveyor for moving sealed cans, filled with food, through the casing; can feeding means entirely outside and at the lower part of the casing where the operator may readily see and adjust a misplaced can; simple and rigid means in the cooker adjustable to cause the cans to roll and agitate their contents for any part of the cooking period; can discharging means at the lower part of the casing, and driving means connected for imparting movement to the conveyor at a number of points in its length to avoid straining the conveyor to the breaking point.

Referring to the drawings, 1 indicates a casing of suitable construction having three openings in the lower parts of the casing. Through opening 2 a chain conveyor 3 carries cans into the casing, through opening 4 the cans are discharged from the conveyor, and through opening 5 the empty conveyor passes to outside the casing. The casing is preferably provided with doors 6 to gain access to the interior of the casing.

Figure 1:
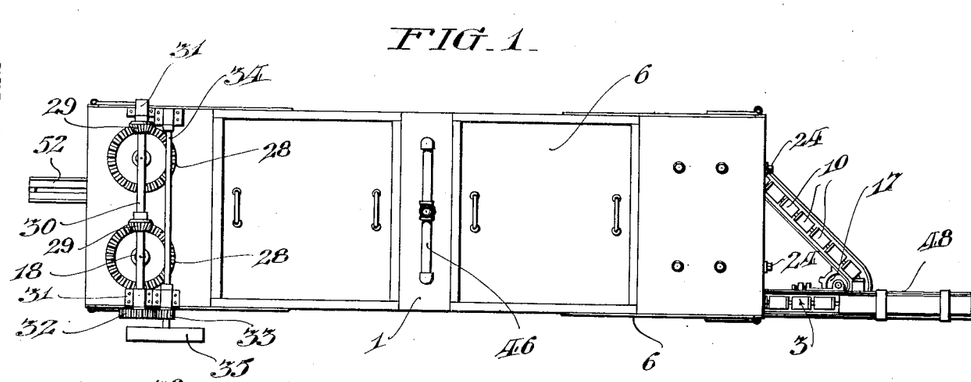
Figure 1 is a plan view of a cooker made in accordance with my invention.
Figure 2:
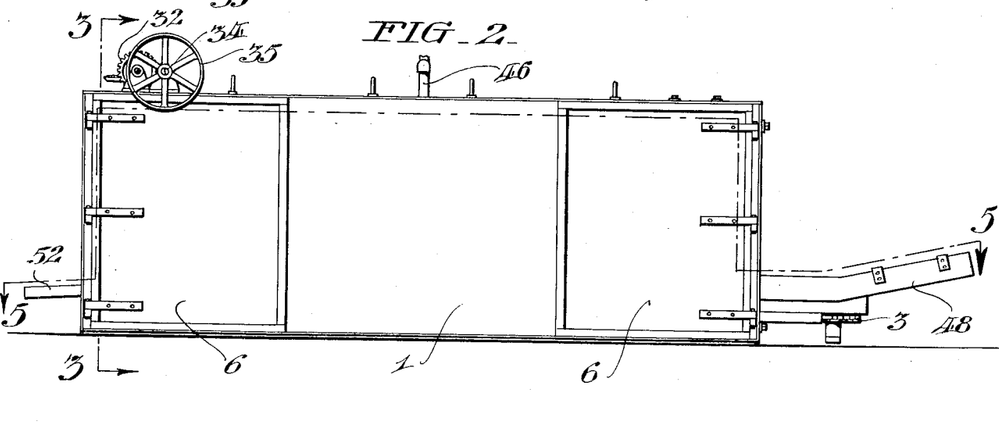
Figure 2 a side elevation of the cooker shown in Figure 1.
Figure 3:
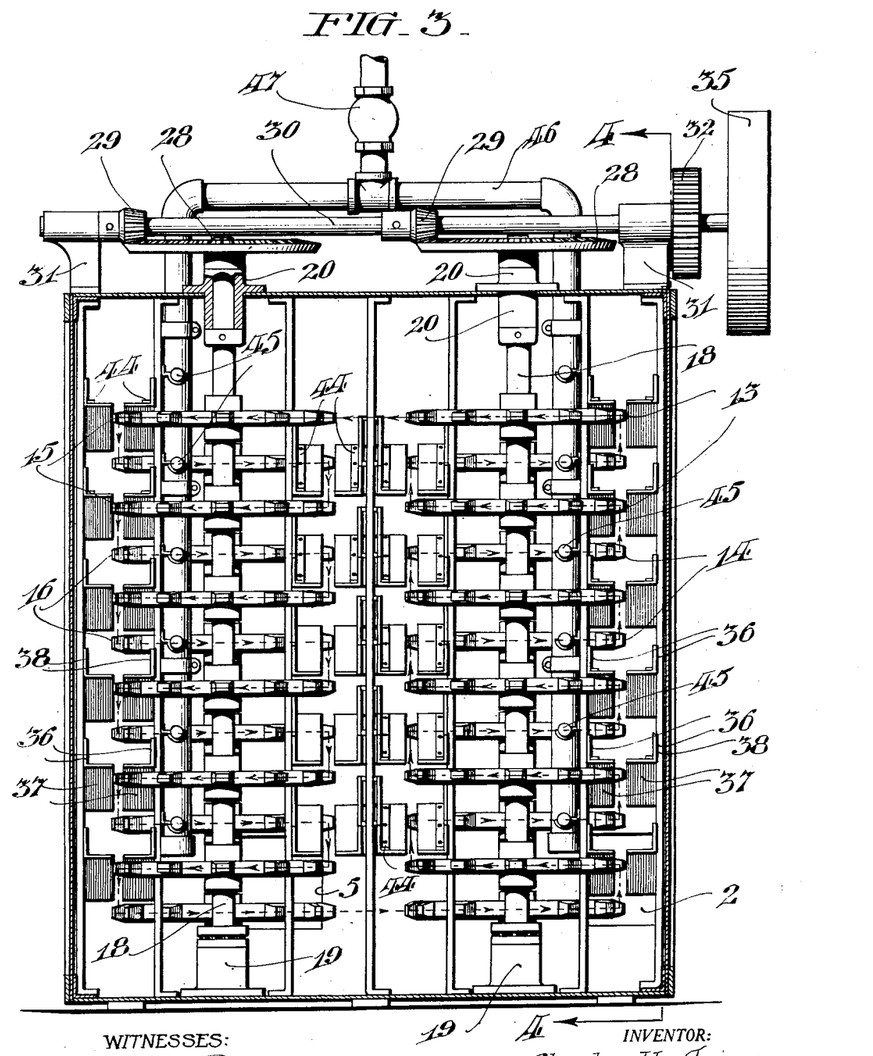
Figure 3 an enlarged section on line 3—3 of Figure 2 showing the interior of the cooker with the conveyor chain omitted, Figure 4 a section drawn on a smaller scale on line 4—4 of Figure 3, Figure 5 a sectional plan on line 5—5 of Figure 2, Figure 6 a fragmentary vertical section similar to Figure 4 illustrating how the cans are fed directly to the chain conveyor, Figure 7 an enlarged side view partly in section of a chain conveyor embodying my invention with a can resting thereon, Figure 8 a section on line 8—8 of Figure 7 illustrating how the carrier slides on its guides when it carries a can, and Figure 9 a like view showing tracks attached to the guides with the can rolled thereon by the carrier.
Figure 4:
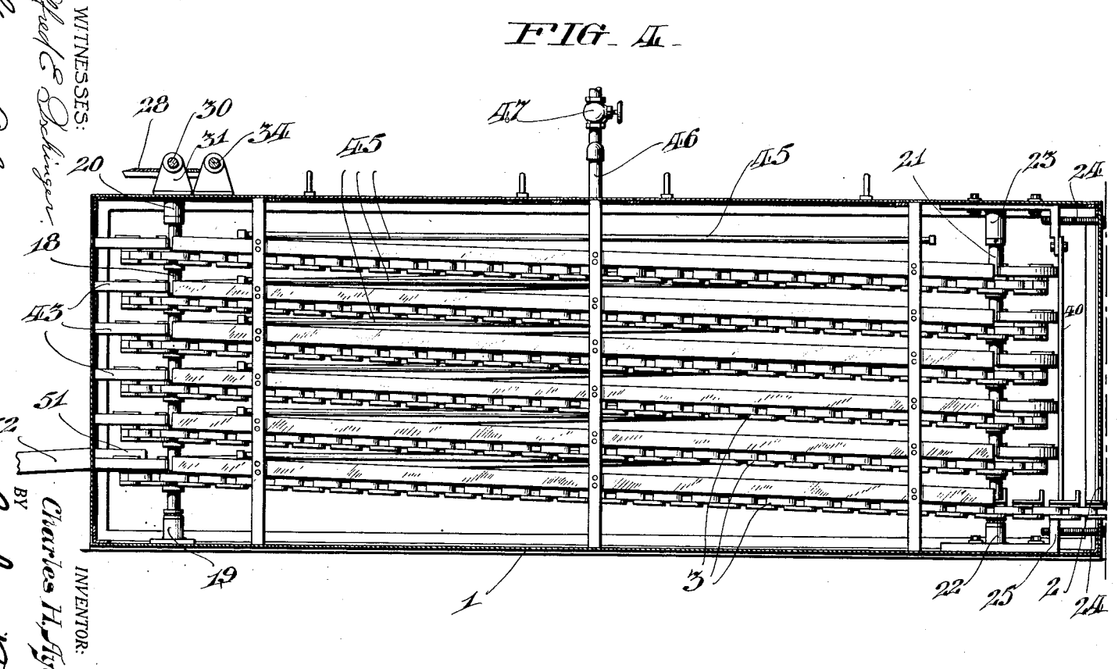
Figure 5:
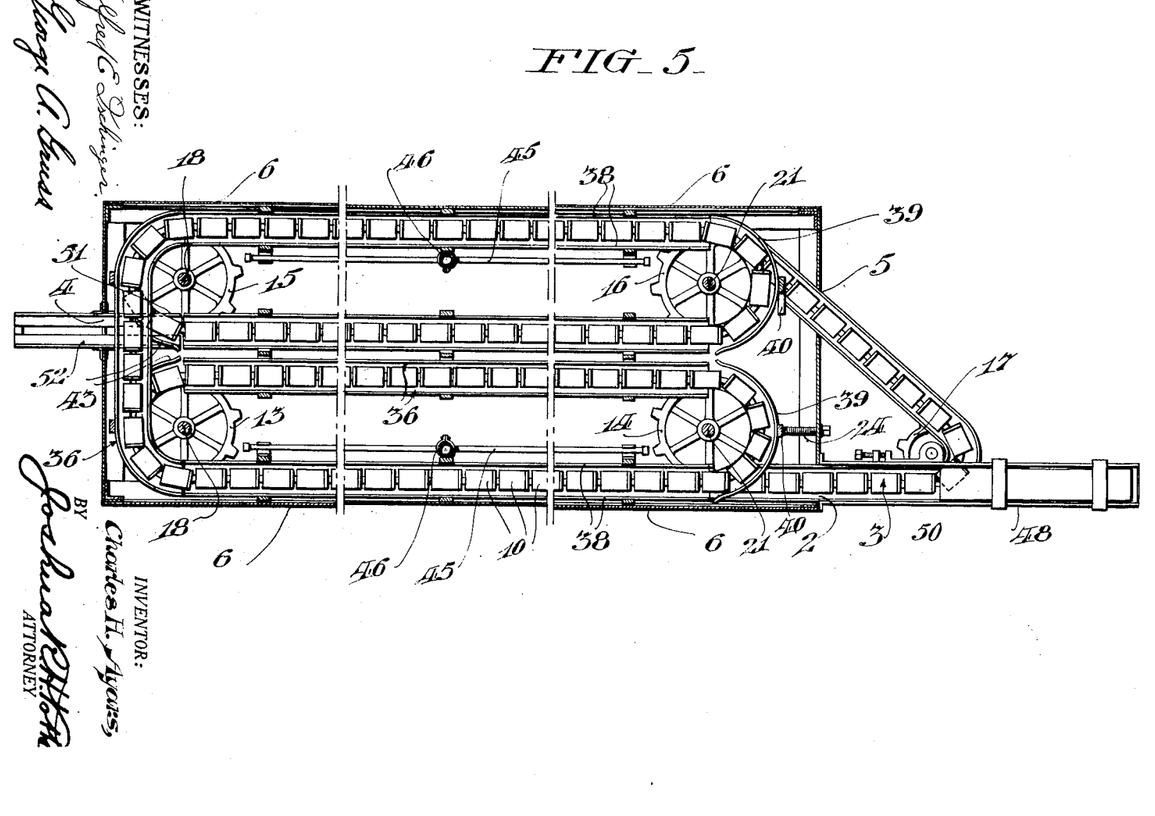
Figure 6:
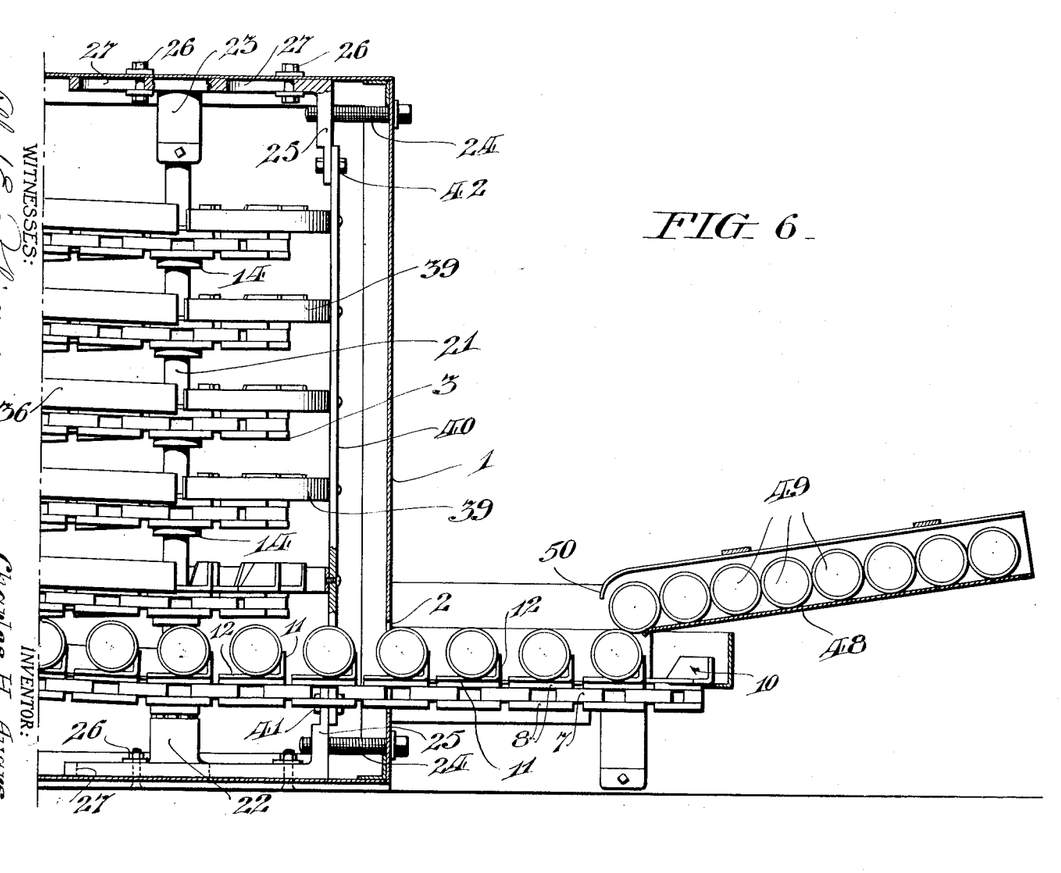
Figure 7:
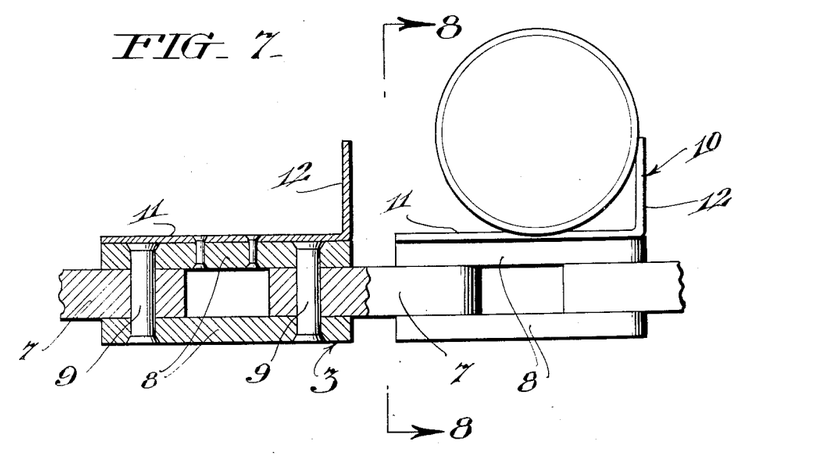
Figure 8:
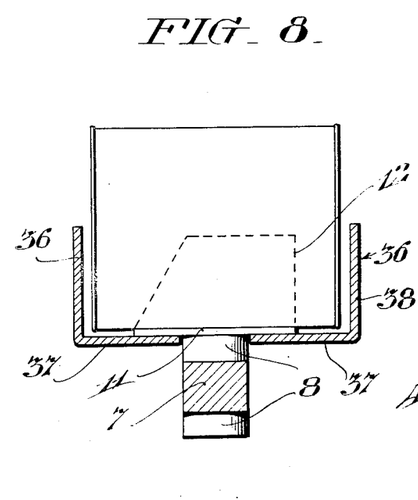
Figure 9:
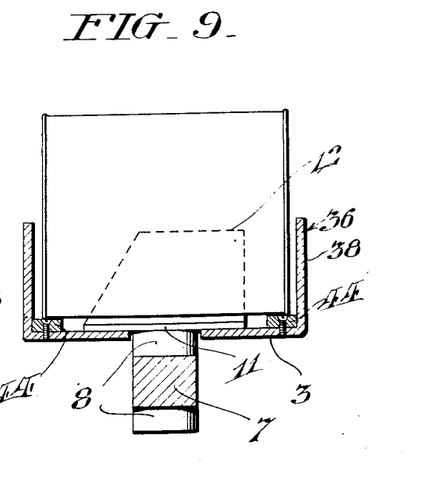

The conveyor chain is of the link type, as shown in Figures 7 to 9, which consists of inner links 7 and outer links 8 pivoted thereto by pins 9. This chain winds around horizontal sprocket wheels in the casing so that it bends horizontally. A carrier 10 is secured to each outer link on the upper side of the chain. The carrier is preferably bent from a single sheet of metal to provide a carrying plate 11 which carries the cans through the casing without rolling them and an upright can pushing plate 12 which rolls the cans through the casing when they are raised from carrying plate 11.

The chain is wound upwardly around one set of horizontal sprocket wheels 13 and 14 at opposite ends of the casing. The chain then passes to and is wound downwardly around another set of sprocket wheels 15 and 16 at opposite ends of the casing and alongside of sprocket wheels 13 and 14. The chain then passes out of the casing through opening 5 to and around an idler sprocket wheel 17 mounted outside of the casing and into the casing again through opening 2 to sprocket wheels 13 and 14.

The parts for supporting and transmitting movement to sprocket wheels 13 and 14 are identical with those for supporting and transmitting movement to sprocket wheels 15 and 16, therefore only the parts for sprocket wheels 13 and 14 will be described and similar reference characters will be given the corresponding parts for sprocket wheels 15 and 16.

All of the sprocket wheels 13 are fixed to a vertical drive shaft 18 rotatable in a step bearing 19 secured to the bottom of the casing and a radial bearing 20 secured to the top of the casing.

All of the sprocket wheels 14 are fixed to a vertical idler shaft 21 rotatable in a step bearing 22 adjustably mounted on the bottom of the casing and a radial bearing 23 adjustably mounted on the top of the casing. By adjusting the bearings 22 and 23 the slack in the chain may be taken up. Each bearing is adjusted by a screw 24 rotatable in the casing and threaded to an extension 25 of the bearing. Each bearing is secured to the casing by bolts 26 passing through slots 27 in the pads of the bearing. The slots permit adjustment of the bearing lengthwise of the chain.

Drive shaft 18 extends out through the top of the casing and has a fixed beveled gear 28 meshing with a beveled pinion 29 fixed on a horizontal shaft 30 mounted in a pair of bearings 31 secured to the top of the casing. Shaft 30 is rotated by a gear 32 fixed on the shaft and meshing with a pinion 33 on another shaft 34. Shaft 34 may be driven in any suitable manner, such as by a pulley 35. Rotary movement is thus transmitted to sprocket wheels 13 and 15 for driving the conveyor chain, through the parts 18 to 35 just described. Owing to each sprocket wheel 13 and 15 being secured to the drive shafts 18, a driving force is transmitted to each winding turn of the chain at each sprocket wheel 13 and 15, thus distributing the driving force to many points in the chain and thereby avoiding straining the chain to the danger point.

To prevent the cans from shifting off the conveyor, and also prevent sagging of the chain between the sprocket wheels, and to cause the cans to roll for any part of the cooking period, the following mechanism is provided: A pair of guides 36, of angle iron, are positioned at opposite sides of each run of the chain, so that the carrying plate 11 of each carrier 10 will slide on the horizontal legs 37 of the guides and the vertical legs 38 will form a channel in which the cans travel. The guides are mounted on the casing in any suitable manner preferably as shown.

To prevent the cans from shifting off the carriers as they pass around sprocket wheels 14 and 16, guide strips 39 are mounted on flat bars 40 so that they extend around the sprocket wheels to the guides 38; the bars are secured at 41 to the extension of the step bearings and at 42 to the extension of the radial bearings so that the strips 39 will be adjusted with the sprocket wheels, thus maintaining the same relative position between the strips and the sprocket wheels at all times. Similar guide strips 43 are secured to the casing to extend around sprocket wheels 13 and 15, to prevent the cans from shifting off the carriers as they pass around these wheels.

To cause the can to roll as it travels between the guides, tracks 44 are removably mounted on the horizontal legs 37 at opposite sides of carrier. These tracks are of such height that the cans pushed thereon will be raised from the carrying plate 11 of the carrier, and the pushing part 12 of the carrier will then push and roll the cans on the track, as shown in Figure 9, thus agitating its contents for quick cooking. These tracks may be mounted on any or all of the guides 36 to cause the cans to roll for any part of the cooking period to effect quick cooking without squashing the solids in the cans. For example when cooking soft vegetables or fruits, less tracks are used, and for harder food more tracks are used. The tracks may be readily secured in place by screws. In this manner the contents of a can may be agitated just sufficiently to effect quick cooking without squashing the solids.

The casing is heated for cooking purposes by steam which issues from perforated branch pipes 45 connected with a main line 46 having a stop valve 47 connected thereto outside of the casing. The steam pipes may be suitably mounted in the casing preferably as shown.

Filled cans are fed onto the carriers from an inclined feed chute 48 suitably secured to the outside of the casing and disposed directly above that part of the conveyor chain outside the casing, so that cans 49 will fall directly onto the carrier outside the casing where the operator may readily see and adjust accidentally misplaced cans. The end 50 of the chute serves as a can stop to prevent more than one can from coming out of the chute when the carrier comes beneath the chute to receive a can.

The cans are discharged from the conveyor by a can deflecting strip 51 secured to the casing and disposed just above the carriers of the lowermost turn of the conveyor chain. As the carriers with cans thereon pass around the lowermost sprocket 15, the cans will engage strip 51 and will be shifted off the carrier. As the carriers pass under strip 51, the cans will be pushed into the inclined discharge chute 52 secured in opening 4 in the lower part of the casing. The cans will thus roll down the chute to outside the casing.

The operation of the cooker is as follows:

Assuming that the conveyor chain is operated and valve 47 is turned on to fill the casing with steam, cans are fed down chute 48 so that they drop onto the carriers. The cans are then carried by the chain without rolling into the casing through opening 2 and upwardly around the set of sprockets 13 and 14 to the upper and hottest part of the casing. After the cans have reached the upper part of the casing they pass to the set of sprockets 15 and 16, and downwardly around these sprockets to the lower part of the casing. During their travel to the upper part of the casing, the cans become gradually heated to practically the temperature of the steam. If the food in the cans is soft it should receive little agitation, and if hard, it may be agitated more. The food is agitated by rolling the cans. The cans are caused to roll by the parts 12 of the carriers pushing the cans on the tracks 44. The length of the tracks determine the amount of rolling or agitation the food receives. The correct length of track to be used is ascertained beforehand by a few trials of cooking.

When the cans reach the lower part of the casing, the food therein will be properly cooked and the solids will not be squashed. The cans are then deflected off the carriers by strip 51 into the discharge chute, and will roll down the chute through opening 4 to outside the casing.

By having the openings through which the conveyor enters and leaves the casing and through which the cans are discharged from the casing, at the lower part of the casing, a small amount of steam escapes from the casing owing to the nature of steam tending to rise and remain at the upper part of the casing.

From actual use I have found that the contents of a can may be agitated just sufficiently to effect quick cooking without squashing the solids in the can, that by using a chain for the carriers, twisting of the conveyor or vertical movement of the carriers is eliminated, and that by mounting the can feeding chute entirely outside the casing, accidental misplacement of the cans on the carriers may be easily seen and quickly adjusted.

While I have described my invention as taking a particular form, it will be understood that the various parts may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. In a cooker, a conveyor chain; means for moving the chain; guides at opposite sides of the chain; carriers on the chain slidable on the guides, and raised portions on the guides at opposite sides of the carriers whereby cans, when on the raised portion, will be rolled by the carriers and, when off the raised portions will be carried by the carriers.

2. In a cooker, a conveyor chain; means for moving the chain; guides at the opposite sides of the chain; a carrier on the chain slidable on the guides, and removable tracks on the guides at opposite sides of the carriers, whereby cans, when on the tracks, will be rolled by the carriers and, when off the tracks, will be carried by the carriers.

3. In a cooker, a conveyor chain; means for moving the chain; guides at opposite sides of the chain; carriers on the chain slidable on the guides, and raised portions on the guides adjacent the carriers, whereby cans, when on the raised portions, will be rolled by the carriers and, when off the raised portion, will be carried by the carriers.

4. In a cooker, a conveyor chain; means for moving the chain; guides at opposite sides of the chain; carriers on the chain each consisting of a carrying part slidable on the guides and a pushing part extending upwardly from the carrying part, and raised portions on the guides, whereby cans, when on the raised portions, will be pushed and rolled by the pushing part of the carriers, and when off the raised portions, will be carried by the carrying part of the carriers.

5. In a cooker, a conveyor chain; means for moving the chain; guides at opposite sides of the chain; carriers on the chain, each consisting of a carrying plate slidable on the guides and a pushing plate extending from the carrying plate, and raised portions on the guides, whereby cans, when on the raised portions, will be pushed and rolled by the pushing plate and, when off the raised portions, will be carried by the carrying plate.

6. In a cooker, a conveyor chain; means for moving the chain; guides at opposite sides of the chain; carriers on the chain, each consisting of a plate bent to have a carrying part slidable on the guides and an upwardly extending pushing part, and raised portions on the guides, whereby cans, when on the raised portions, will be pushed and rolled by the pushing part and, when off the raised portions, will be carried by the carrying part.

7. In a cooker, a conveyor chain; means for moving the chain; guides at opposite sides of the chain; carriers on the chain, each consisting of a plate bent to have a carrying part slidable on the guides and an upwardly extending pushing part, and tracks on the guides at each side of and disposed above the carrying part.

8. A cooker including a casing and a conveyor for moving the cans through the casing, said conveyor passing into and out of the casing; means for moving the conveyor through the casing means for feeding cans to that part of the conveyor outside the casing, means for removing the cans from the body of the conveyor and for rolling said cans until returned to the body of the conveyor during the progress of the conveyor through the casing, and means for discharging the cans from the conveyor.

9. A cooker including a casing and a conveyor for moving the cans through the casing, said conveyor passing into and out of the lower part of the casing; means for moving the conveyor through the casing; means for feeding cans to that part of the conveyor outside the casing, means in association with said conveyor for keeping said cans in a stationary position and for rolling said cans at desired intervals during the progress of said conveyor through the casing, and means for discharging the cans from the conveyor through the lower part of the casing.

10. A cooker including a casing; a conveyor chain passing into and out of the casing; means for moving the chain through the casing; carriers on the chain open to receive cans from above; said carriers being adapted to retain said cans in a stationary position and to roll said cans when the cans are projected above their normal position on the carrier; an inclined chute mounted above that part of the conveyor outside the casing, whereby cans will drop into the carriers outside the casing, and means for discharging the cans from the conveyor.

11. A cooker including a casing; a pair of vertical drive shafts mounted in the casing; a pair of vertical idler shafts mounted in the casing; sprocket wheels fixed to the shafts; an idler sprocket wheel mounted outside of the casing; a chain conveyor passing from said idler sprocket wheel into the casing, winding around the sprockets of one drive and idler shaft toward the upper part of the casing, passing to and winding around the sprockets of the other drive and idler shaft to the lower part of the casing and passing out of the casing to the idler sprocket wheel; means for feeding cans to that part of the chain conveyor outside the casing, means for removing said cans from the conveyor during its progress through the casing, rolling the cans and returning the cans to their same position on the conveyor, and means for discharging cans from the conveyor.

12. A cooker including a casing; a pair of vertical drive shafts mounted in the casing; a pair of vertical idler shafts mounted in the casing; sprocket wheels fixed to the shafts; an idler sprocket wheel mounted outside of the casing; a chain conveyor passing into the lower part of the casing, winding around the sprockets of one drive and idler shaft toward the upper part of the casing, passing to and winding around the sprockets of the other drive and idler shaft to the lower part of the casing and passing out of the casing to the idler sprocket wheel; means for feeding cans to that part of the conveyor outside the casing; means for retaining a can in one position with respect to said conveyor during the progress of the conveyor through the casing, the can being retained in a position on the conveyor during a portion of the time and in a position above the conveyor during other portions of the time; means for discharging cans from the conveyor through the casing, and driving means mounted outside the casing and operatively connected with the drive shafts.

13. A cooker including a casing; a pair of vertical drive shafts mounted in the casing; a pair of vertical idler shafts adjustably mounted in the casing; sprocket wheels fixed to the shafts; an idler sprocket wheel mounted outside of the casing; a chain conveyor passing from the idler sprocket wheel into the lower part of the casing, winding around the sprockets of one drive and idler shaft toward the upper part of the casing, passing to and winding around the sprockets of the other drive and idler shaft to the lower part of the casing and passing out of the casing to the idler sprocket wheel; means for feeding cans to the chain conveyor outside the casing, means disassociated from the conveyor for lifting the cans above the conveyor, and means on the conveyor for rolling said cans while in a position above the conveying means; and means for discharging cans from the conveyor.

14. In a cooker for products in cans, a conveyor for moving cans therethrough, a plurality of driving means in the cooker for raising a can on said conveyor from an entrance in the cooker situated near the bottom thereof to a point near the top of the cooker and for then lowering the can to an exit situated at the bottom of the cooker, and means adapted to function in association with the conveyor for projecting a can above the conveying portion thereof and for rolling said can until it is returned to the conveying portion.

15. In a cooker for products in cans, an endless conveyor for moving cans therethrough, driving means connected with said conveyor at a plurality of points for progressively moving a series of cans through the cooker from an entrance at the bottom of the cooker to the uppermost portion of said cooker and then lowering the cans to an exit, means uncontrolled by said conveyor whereby cans are removed from the conveyor and agitated by means controlled by the conveyor for a desired length of time.

16. In a cooker, a carrier for food containers having a movable supporting bed; means for moving said carrier from a point of least temperature in the cooker to one of greatest temperature and then from the cooker, said means being adapted to distribute the strain of the weight of containers thereon to a plurality of points of the carrier; means for preventing the containers from leaving their relative positions with respect to the supporting bed of the carrier; means for removing the cans from the supporting bed and agitating them, and means for returning the cans to their same positions on the bed after said agitation.

In testimony whereof I have signed my name to this specification.

CHARLES H. AYARS.